(12) United States Patent
Rahman et al.

(10) Patent No.: US 7,899,905 B2
(45) Date of Patent: Mar. 1, 2011

(54) PARTIAL SUBSCRIPTION/EVENTING AND EVENT FILTERING IN A HOME NETWORK

(75) Inventors: Mahfuzur Rahman, Santa Clara, CA (US); Jian Huang, Santa Clara, CA (US)

(73) Assignee: Samsung Electronics Co., Ltd., Suwon (KR)

(*) Notice: Subject to any disclaimer, the term of this patent is extended or adjusted under 35 U.S.C. 154(b) by 169 days.

(21) Appl. No.: 12/243,514

(22) Filed: Oct. 1, 2008

(65) Prior Publication Data

US 2010/0036941 A1 Feb. 11, 2010

Related U.S. Application Data

(60) Provisional application No. 61/087,007, filed on Aug. 7, 2008.

(51) Int. Cl.
*G06F 15/16* (2006.01)
*G06F 15/173* (2006.01)
*G06F 15/177* (2006.01)

(52) U.S. Cl. .......... 709/224; 709/229; 706/12; 370/242; 370/252

(58) Field of Classification Search .......... 709/217–228; 706/12; 370/242, 252
See application file for complete search history.

(56) References Cited

U.S. PATENT DOCUMENTS

| | | | |
|---|---|---|---|
| 2006/0079231 A1* | 4/2006 | Jeong et al. | 455/434 |
| 2007/0260766 A1* | 11/2007 | Kim et al. | 710/15 |
| 2008/0010301 A1* | 1/2008 | Tian et al. | 707/10 |
| 2008/0243869 A1* | 10/2008 | Choi et al. | 707/10 |
| 2009/0019006 A1* | 1/2009 | Kim et al. | 707/3 |
| 2009/0304019 A1* | 12/2009 | Chan | 370/432 |
| 2010/0010944 A1* | 1/2010 | Cheng et al. | 706/12 |
| 2010/0034104 A1* | 2/2010 | Rahman et al. | 370/252 |

OTHER PUBLICATIONS

UPnP Forum, UPnP Device Architecture 1.0, Apr. 24, 2008, pp. 1-77.

* cited by examiner

*Primary Examiner* — Haresh N Patel
(74) *Attorney, Agent, or Firm* — Beyer Law Group LLP

(57) ABSTRACT

In one embodiment, a method for monitoring events in a home network is provided. The method includes receiving a subscription request from a control point, wherein the subscription request indicates one or more event variables to monitor for the control point. Then a change is detected in an event variable. Then, it is determined if the event variable has been indicated by the control point as an event variable to monitor for the control point. If so, then the control point is notified of the change in the event variable.

16 Claims, 4 Drawing Sheets

PARTIAL SUBSCRIPTION/EVENTING AND EVENT FILTERING IN A HOME NETWORK

CROSS-REFERENCE TO RELATED APPLICATIONS

This application claims the benefit of priority to U.S. Provisional Patent Application Ser. No. 61/087,007, filed on Aug. 7, 2008 entitled ENABLING PARTIAL SUBSCRIPTION/EVENTING AND EVENT FILTERING IN UNIVERSAL PLUG AND PLAY (UPnP) NETWORK, which is incorporated herein by reference in its entirety for all purposes.

BACKGROUND OF THE INVENTION

1. Field of the Invention

The present invention relates to computing. More particularly, the present invention relates to partial subscription/eventing and event filtering in a home network.

2. Description of the Related Art

Universal Plug and Play (UPnP) is a distributed, open networking architecture that allows devices to connect seamlessly and to simplify the implementation of networks in the home (data sharing, communications, and entertainment) and corporate environments. UPnP achieves this by defining and publishing UPnP device control protocols built upon open, Internet-based communication standards.

UPnP has grown in popularity of late in part due to the rise in popularity of media servers. Media servers are small computers that store multiple types of content (e.g., photos, music, videos, etc.). The content may then be streamed from a media server to one or more control points (e.g., iPod, television set, etc.).

As an example, a "Media Server" device might contain a significant portion of the homeowner's audio, video, and still-image library. In order for the homeowner to enjoy this content, the homeowner must be able to browse the objects stored on the Media Server, select a specific one, and cause it to be "played" on an appropriate rendering device.

For maximum convenience, it is highly desirable to allow the homeowner to initiate these operations from a variety of User Interface (UI) devices. In most cases, these UI devices will either be a UI built into the rendering device, or a stand-alone UI device such as a wireless PDA or tablet. In other cases, the home network user interface device could be more remote and communicate with the home network through a tunneling mechanism on the Internet.

Currently, UPnP clients ("control points") may subscribe to event messages from a UPnP service. When an event occurs in the service, such as the addition or deletion of a file, service errors, etc., the subscribing control points receive event messages notifying them of the event. Each event reflects a change in some state variable being monitored by the service.

The drawback of this approach is that the service sends all event messages to all subscribers. There may be situations, however, where some control points may not want or need to receive information regarding all events. There is no way for a control point to subscribe to event messages on a variable-by-variable basis.

SUMMARY OF THE INVENTION

In one embodiment, a method for monitoring events in a home network is provided. The method includes receiving a subscription request from a control point by a device, wherein the subscription request indicates one or more event variables to monitor for the control point. The information from the subscription request is stored by the device. Then a change is detected in an event variable. Then, it is determined if the event variable has been indicated by the control point as an event variable to monitor for the control point. If so, then the control point is notified of the change in the event variable.

In another embodiment, another method for monitoring events in a home network is provided. The method includes receiving, at a proxy, a subscription request from a control point, wherein the subscription request indicates one or more event variables to monitor for the control point. The information from the subscription request is stored. Then an event notification is received from a home network device by the proxy. Then it is determined if the control point should receive the event notification by comparing the event notification to the information from the subscription request. If so, then the event notification is sent to the control point by the proxy.

In another embodiment, a system for monitoring events in a home network is provided, the system comprising: one or more control points; a home network device configured to: receive a subscription request from a control point, wherein the subscription request indicates one or more event variables to monitor for the control point; detect a change in an event variable; determine if the event variable has been indicated by the control point as an event variable to monitor for the control point; if the event variable has been indicated by the control point as an event variable to monitor, notify the control point of the change in the event variable.

In another embodiment, a system for monitoring events in a home network is provided comprising: one or more control points; a home network device; a proxy configured to: receive, at a proxy, a subscription request from a control point, wherein the subscription request indicates one or more event variables to monitor for the control point; store information from the subscription request; receive an event notification from a home network device; determine if the control point should receive the event notification by comparing the event notification to the information from the subscription request; and send the event notification to the control point if the control point should receive the event notification.

In another embodiment, a program storage device readable by a machine tangibly embodying a program of instructions executable by the machine to perform a method for monitoring events in a home network is provided, the method comprising: receiving a subscription request from a control point, wherein the subscription request indicates one or more event variables to monitor for the control point; detecting a change in an event variable; determining if the event variable has been indicated by the control point as an event variable to monitor for the control point; if the event variable has been indicated by the control point as an event variable to monitor, notifying the control point of the change in the event variable.

In another embodiment, a program storage device readable by a machine tangibly embodying a program of instructions executable by the machine to perform a method for monitoring events in a home network is provided, the method comprising: receiving, at a proxy, a subscription request from a control point, wherein the subscription request indicates one or more event variables to monitor for the control point; storing information from the subscription request; receiving an event notification from a home network device; determining if the control point should receive the event notification by comparing the event notification to the information from the subscription request; and sending the event notification to the control point if the control point should receive the event notification.

DETAILED DESCRIPTION OF SPECIFIC EMBODIMENTS

Figure 1:
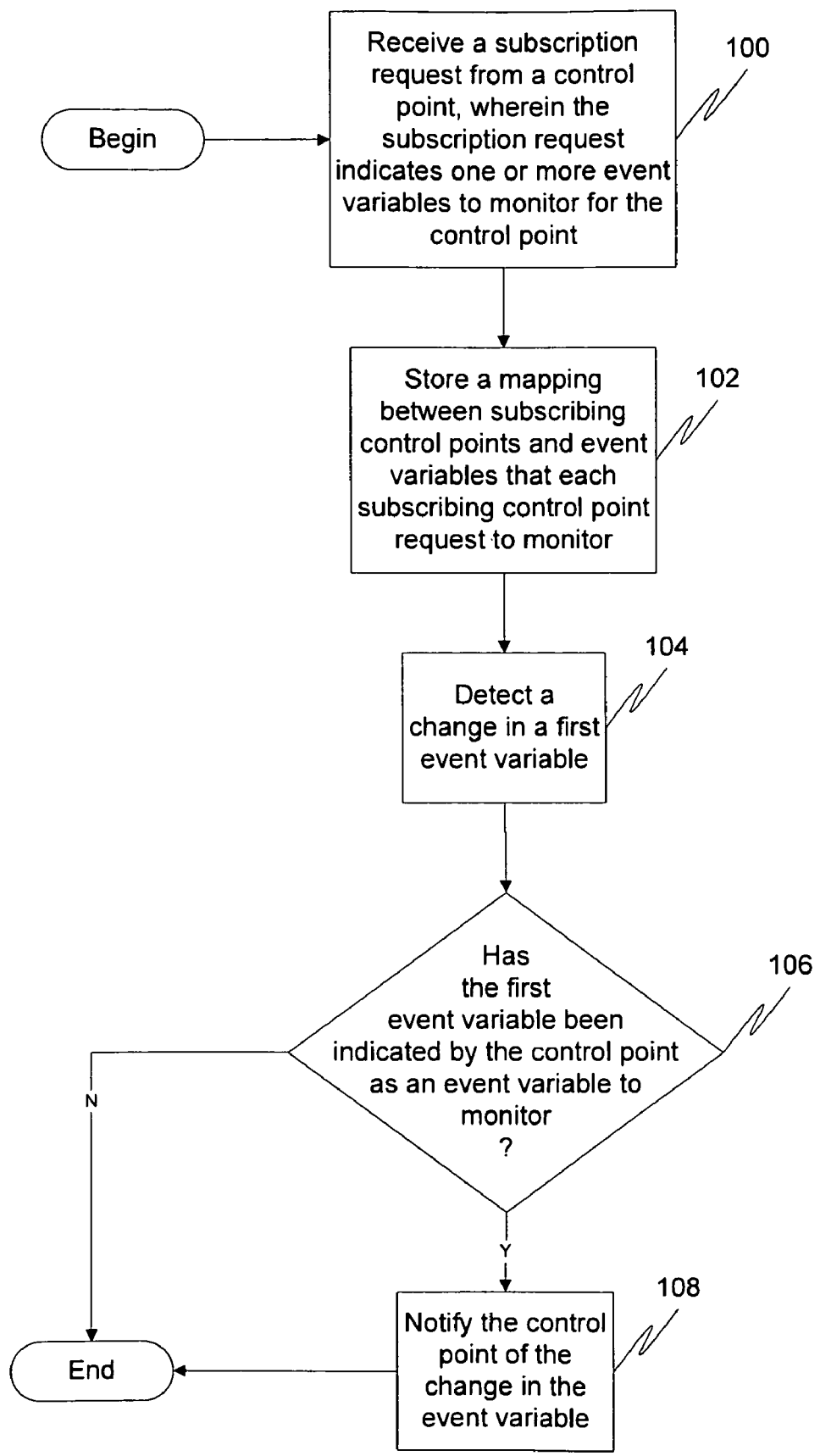
FIG. 1 is a flow diagram illustrating a method for monitoring events in a home network in accordance with an embodiment of the present invention.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

It should be noted that the term "home networking" as used throughout this document refers to a type of network that is commonly used in homes to connect media devices. There is no requirement, however, that this type of networking actually be used in homes, as it has equal applicability for use in businesses or other entities. As such, the term "home networking" shall not be construed as limiting any embodiments of the present invention to use in a home, and shall be interpreted as any type of local area network (LAN).

For purposes of this document, the term "control point" shall be interpreted to mean any client device in a home network. A "traffic specification" shall be interpreted to mean any indication of an application's requirements, preferences, or expectations regarding network traffic it plans on receiving and/or sending.

In an embodiment of the present invention, partial subscription and eventing is provided to allow a control point to subscribe only to events related to state variables the control point is interested in. Subscribers then do not receive all event messages from a service, but rather receive only event messages for the state variable to which they have subscribed. This embodiment may be mixed with any of the other embodiments of the present invention.

In one embodiment, this is accomplished by adding a tag to the service description. The UPnP Service description (typically an Extensible Markup Language (XML) document describing the UPnP service). The tag may be, for example, <partialSubscription>. Existence of this tag in the service description specifies that partial subscription is supported by the service. A new header is then added in a subscribe message for state variables to which the subscribe message applies. Variables may be separate by, for example, a comma, and may be identified by their name values. The publisher then maintains a list of all subscribers, and a list of all variables to which the subscribers wish to receive events.

In one embodiment, the new subscribe message will be formatted as follows:

SUBSCRIBE publisher path HTTP/1.1
HOST: publisher host:publisher port
SID: uuid:subscription UUID
TIMEOUT: Second-requested subscription duration
STATEVARIABLES: comma separated <name> of state variables As described above, the publisher maintains a list of all subscribers and a list of all variables from which the subscribers wish to receive events. In addition to this information, the publisher may also maintain, for each subscriber, a unique subscription identifier, a delivery address (e.g., Uniform Resource Locator), an event key, a subscription duration, a list of the web protocol (e.g., Hypertext Transfer Protocol) version supported by the subscriber.

In one embodiment of the invention, subscription granularity is at the state variable level.

FIG. 1 is a flow diagram illustrating a method for monitoring events in a home network in accordance with an embodiment of the present invention. This method may be performed in a device in the home network that generates events that might be of interest to one or more control points in the home network.

At 100, a subscription request is received from a control point, wherein the subscription request indicates one or more event variables to monitor for the control point. The subscription request may include a tag identifying that the request contains a partial eventing subscription request. At 102, a mapping between subscribing control points and event variables that each subscribing control point requests to monitor is stored. This mapping may also include a unique subscription identifier for each subscriber, a delivery address for events for each subscriber, a subscription duration for each subscriber, and/or an indication of a web protocol version supported by each subscriber. At 104, a change in an event variable is detected. At 106, it is determined if the event variable has been indicated by the control point as an event variable to monitor for the control point. If so, then at 108, the control point is notified of the change in the event variable.

Figure 2:
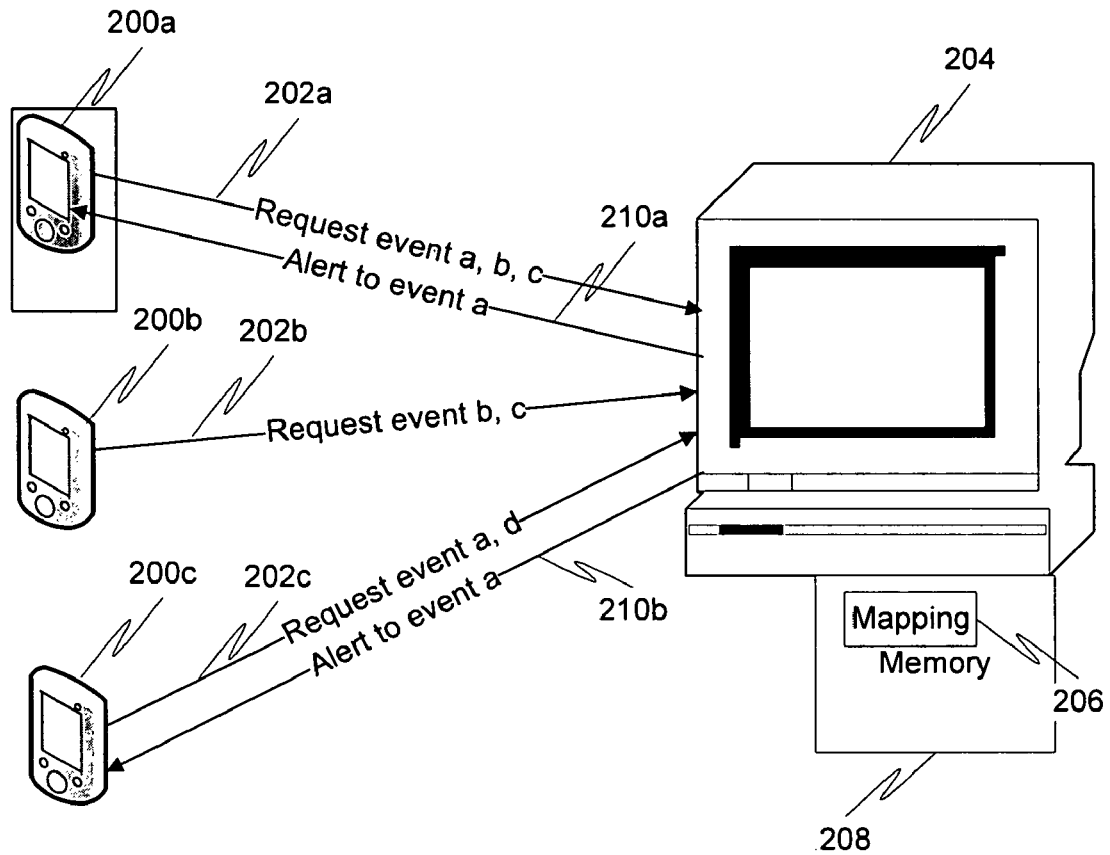
FIG. 2 is an architecture diagram illustrating a home network in accordance with another embodiment of the present invention.

FIG. 2 is an architecture diagram illustrating a home network in accordance with another embodiment of the present invention. This architecture does not include a proxy for the subscription and eventing control, and thus relies on individual devices to manage their own subscriptions. Thus, control points 200a-200c may each send subscription requests 202a-202c to device 204. Each of the requests 202a-202c may contain their own set of requested event variables to monitor (of course, it is possible that two requests could contain identical sets of requested event variables to monitor). Device 204 then stores a mapping 206 in a memory 208, wherein the mapping indicates which control points 200a-

200c want to monitor which events. When an event occurs, the device 204 then checks this mapping and only sends event notifications 210a, 210b to the control points that requested to monitor the event.

It should be noted that the memory 208 in which the device 204 may or may not be located at the device. As long as the memory 208 is reachable via communication by the device 204, the memory 208 can be located anywhere. Nothing in this document shall be construed as in any way limiting the location of where the mapping 206 is stored.

In another embodiment, a centralized proxy is utilized as a repository that, in addition to keeping device information, can act as a subscription server and filter event messages for devices based upon the events the subscribers wish to receive. In other words, the proxy may be used to free up the home network device from the task of managing which subscribers receive which events. This reduces the burden on the device, as the device simply needs to send all event messages to the subscription server as it always had, and the subscription server takes the lead in determining whether to pass the events to subscribers and, if so, to which subscribers.

The proxy receives subscription messages from the control points and disseminates the event messages based on the state of the subscriptions.

Figure 3:
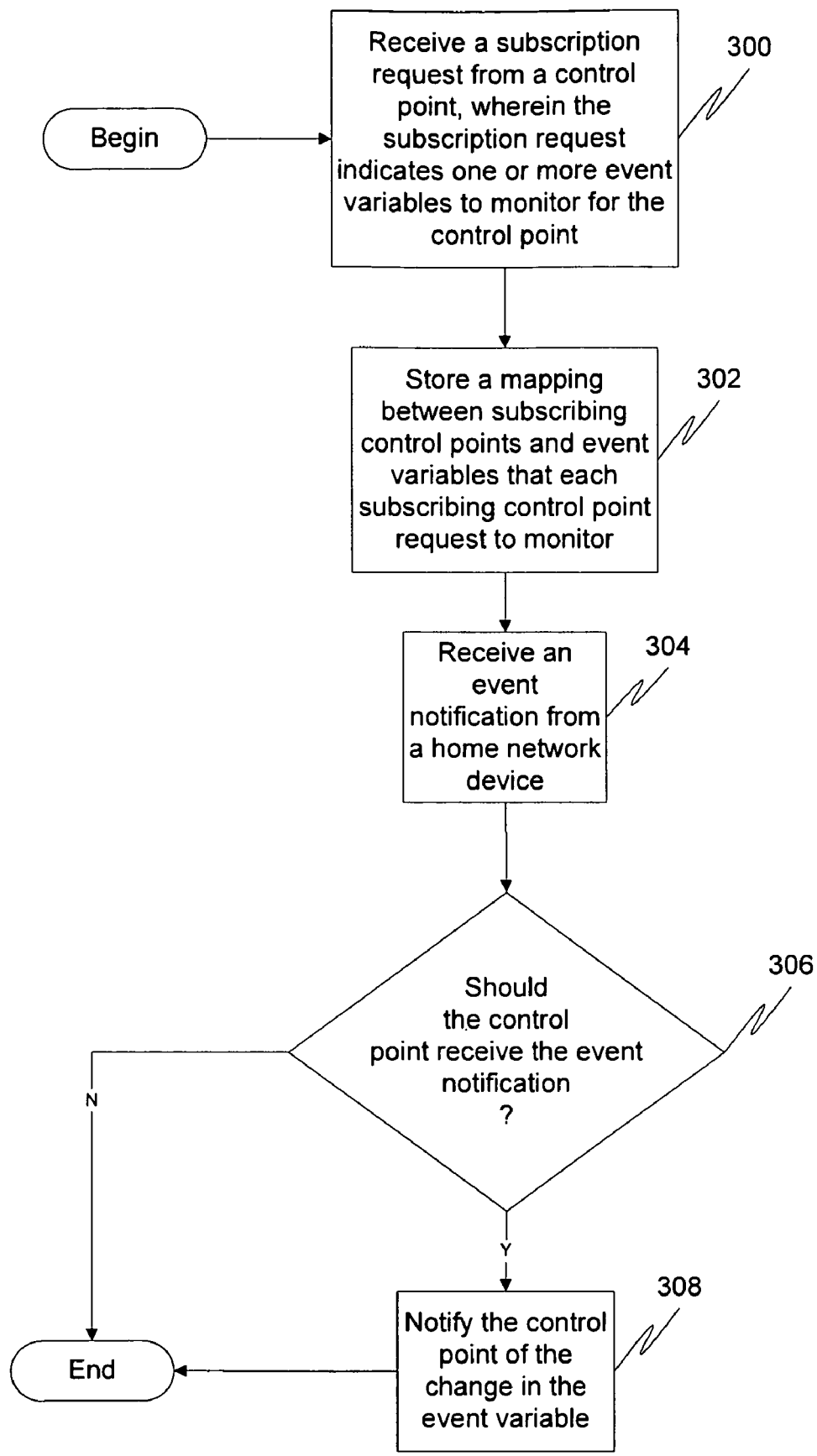
FIG. 3 is a flow diagram illustrating a method for monitoring events in a home network in accordance with another embodiment of the present invention.

FIG. 3 is a flow diagram illustrating a method for monitoring events in a home network in accordance with another embodiment of the present invention. This method may be performed in a proxy located in a home network where a device in the home network generates events that might be of interest to one or more control points in the home network. At 300, a subscription request is received from a control point, wherein the subscription request indicates one or more event variables to monitor for the control point. The subscription request may include a tag identifying that the request contains a partial eventing subscription request. At 302, a mapping between subscribing control points and event variables that each subscribing control point requests to monitor is stored. This mapping may also include a unique subscription identifier for each subscriber, a delivery address for events for each subscriber, a subscription duration for each subscriber, and/or an indication of a web protocol version supported by each subscriber. At 304, an event notification is received from a home network device. At 306, it is determined if the control point should receive the event notification by comparing the event notification to the information from the subscription request. If so, then at 308, the event notification is sent to the control point.

Figure 4:
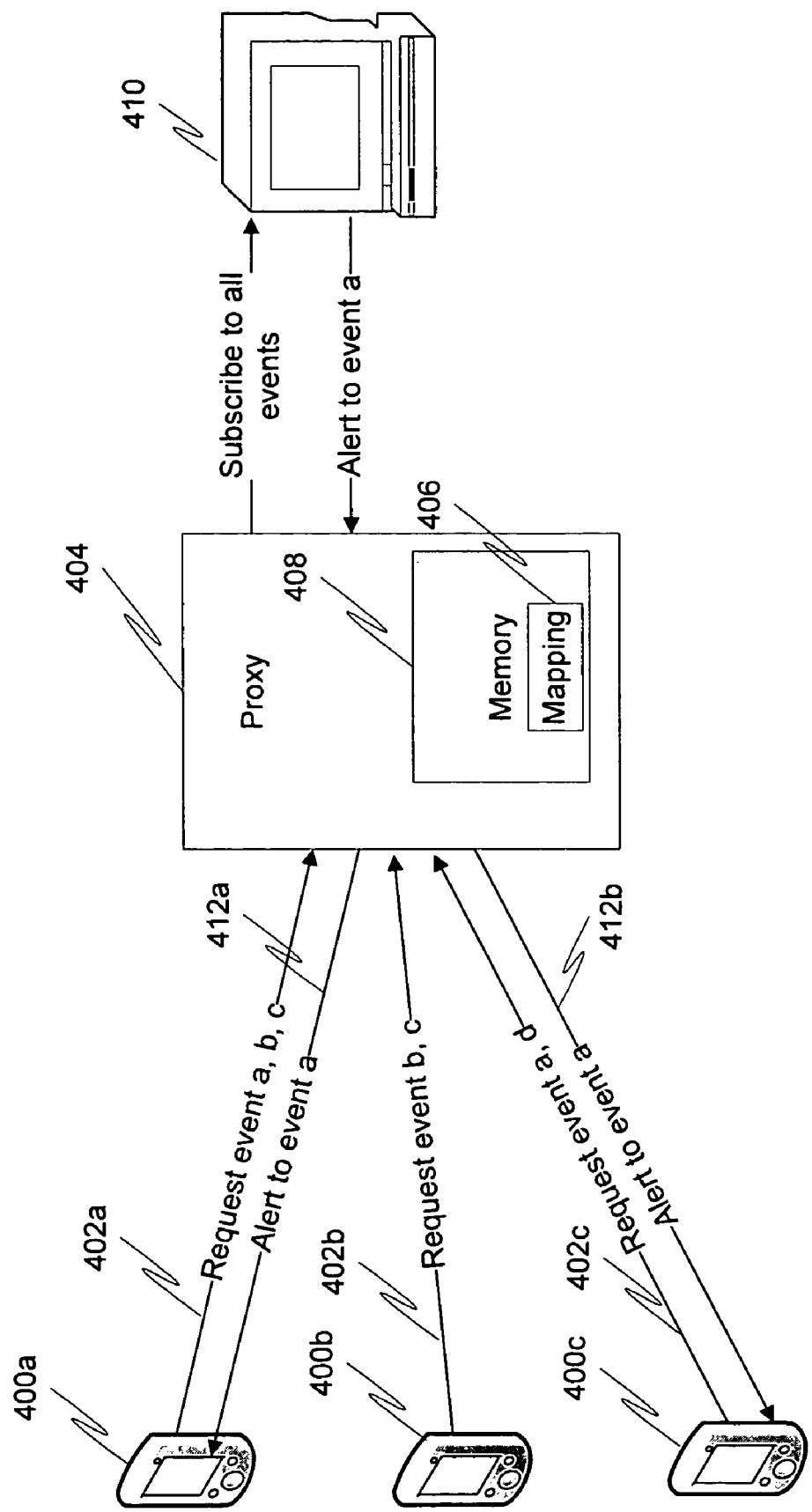
FIG. 4 is an architecture diagram illustrating a home network in accordance with another embodiment of the present invention.

FIG. 4 is an architecture diagram illustrating a home network in accordance with another embodiment of the present invention. This architecture includes a proxy for the subscription and eventing control, and thus frees up the individual devices from managing their subscriptions. Thus, control points 400a-400c may each send subscription requests 402a-402c to proxy 404. Each of the requests 402a-402c may contain their own set of requested event variables to monitor (of course, it is possible that two requests could contain identical sets of requested event variables to monitor). Proxy 404 then stores a mapping 406 in a memory 408, wherein the mapping indicates which control points 400a-400c want to monitor which events. When an event occurs, the device 410 then simply sends an event notification to proxy 404. Proxy 404 checks this mapping and only sends event notifications 412a, 412b to the control points that requested to monitor the event.

It should be noted that the memory 408 in which the proxy 404 may or may not be located at the proxy. As long as the memory 408 is reachable via communication by the proxy 404, the memory 408 can be located anywhere. Nothing in this document shall be construed as in any way limiting the location of where the mapping 406 is stored.

Use of the tag in partial eventing subscription messages allows the solution to be compatible with older systems that do not support partial eventing (i.e., legacy systems). In these systems, the tag and any additional partial eventing information related to it will simply be ignored.

Additionally, the impact of the present invention on the UPnP device architecture (UDA) is minimal. Subscription messages are changed only to include a specialized tag and a listing of events to monitor. In the proxy environment, UPnP need only know to alert the proxy when an event occurs—no other changes to the device are necessary. In a non-proxy environment, the device needs only to maintain a list of state variable to which a subscriber has subscribed and check this list upon occurrence of an event. Notify and Unsubscribe messages are unchanged.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A method for partial event subscription in a home network, the method comprising:

receiving, at a service in a device in the home network, a subscription request from a control point, wherein the service monitors a plurality of state variables, wherein the subscription request indicates one or more of the state variables on which to receive automatic updates of state changes the one or more state variables contained in the subscription request representing a subset of all state variables monitored by the service;

establishing a subscription for each of the state variables contained in the subscription request by storing information regarding the control point in a mapping between the control point and each of the state variables;

detecting a change in a particular state variable monitored by the service;

determining whether the particular state-variable is part of a subscription by accessing the mapping to determine if any control points have been mapped to the particular state; and when the particular state variable is part of a subscription, notifying the control point identified in the mapping between the control point and the particular state variable of the change in the state variable.

2. The method of claim 1, wherein the mapping further includes:

a unique subscription identifier for each subscriber.

3. The method of claim 1, wherein the mapping further includes:

a delivery address for events for each subscriber.

4. The method of claim 1, wherein the mapping further includes:

a subscription duration for each subscriber.

5. The method of claim 1, wherein the mapping further includes:

an indication of a web protocol version supported by each subscriber.

6. The method of claim 1, wherein the subscription request includes a tag identifying that the request contains a partial eventing subscription request.

7. A method for partial event subscription in a home network, the method comprising:
- receiving, at a proxy device, a subscription request from a control point, wherein the subscription request indicates one or more state variables of a service in a device in the home network to monitor for the control point and to send automatic updates to the control point for, the one or more state variables representing a subset of all state variables monitored by the service;
- establishing a subscription for each of the state variables contained in the subscription request by storing information regarding the control point in a mapping between the control point and each of the state variables;
- receiving an event notification from a home network device;
- determining whether the control point should receive the event notification by comparing the event notification to the state variables from the subscription request; and
- sending the event notification to the control point when the control point should receive the event notification.

8. The method of claim 7, wherein the mapping further includes:
- a unique subscription identifier for each subscriber.

9. The method of claim 7, wherein the mapping further includes:
- a delivery address for events for each subscriber.

10. The method of claim 7, wherein the mapping further includes:
- a subscription duration for each subscriber.

11. The method of claim 7, wherein the mapping further includes:
- an indication of a web protocol version supported by each subscriber.

12. The method of claim 7, wherein the subscription request includes a tag identifying that the request contains a partial eventing subscription request.

13. A system for partial event subscription in a home network, the system comprising:
- one or more control points;
- a home network device configured to:
  - receive, at a service, a subscription request from a control point, wherein the service monitors a plurality of state variables, wherein the subscription request indicates one or more of the state variables on which to receive automatic updates of state changes, the one or more state variables contained in the subscription request representing a subset of all state variables monitored by the service;
  - establish a subscription for each of the state variables contained in the subscription request by storing information regarding the control point in a mapping between the control point and each of the state variables;
  - detect a change in a particular state variable monitored by the service;
  - determine whether the particular state variable is part of a subscription by accessing the mapping to determine if any control points have been mapped to the particular state variable; and
  - when the particular state variable is part of a subscription, notify the control point identified in the mapping between the control point and the particular state variable of the change in the state variable.

14. A system for partial event subscription in a home network, the system comprising:
- one or more control points;
- a home network device;
- a proxy device configured to:
  - receive a subscription request from a control point, wherein the subscription request indicates one or more state variables of a service in a device in the home network to monitor for the control point and to send automatic updates to the control point for, the one or more state variables representing a subset of all state variables monitored by the service;
  - establish a subscription for each of the state variables contained in the subscription request by storing information regarding the control point in a mapping between the control point and each of the state variables;
  - receive an event notification from a home network device;
  - determine whether the control point should receive the event notification by comparing the event notification to the state variables from the subscription request; and
  - send the event notification to the control point when the control point should receive the event notification.

15. A program storage device readable by a machine tangibly embodying a program of instructions executable by the machine to perform a method for partial event subscription in a home network, the method comprising:
- receiving, at a service in a device in the home network, a subscription request from a control point, wherein the service monitors a plurality of state variables, wherein the subscription request indicates one or more of the state variables on which to receive automatic updates of state changes, the one or more state variables contained in the subscription request representing a subset of all state variables monitored by the service;
- establishing a subscription for each of the state variables contained in the subscription request by storing information regarding the control point in a mapping between the control point and each of the state variables;
- detecting a change in a particular state variable monitored by the service;
- determining whether the particular state variable is part of a subscription by accessing the mapping to determine if any control points have been mapped to the particular state variable and
- when the particular state variable is part of a subscription, notifying the control point identified in the mapping between the control point and the particular state variable of the change in the state variable.

16. A program storage device readable by a machine tangibly embodying a program of instructions executable by the machine to perform a method for monitoring events in a home network, the method comprising:
- receiving, at a proxy device, a subscription request from a control point, wherein the subscription request indicates one or more state variables of a service in a device in the home network to monitor for the control point and to send automatic updates to the control point for, the one or more state variables representing a subset of all state variables monitored by the service;
- establishing a subscription for each of the state variables contained in the subscription request by storing information regarding the control point in a mapping between the control point and each of the state variables;

receiving an event notification from a home network device;

determining whether the control point should receive the event notification by comparing the event notification to the state variables from the subscription request; and sending the event notification to the control point when the control point should receive the event notification.

* * * * *